United States Patent [19]
Wood et al.

[11] Patent Number: 5,290,095
[45] Date of Patent: Mar. 1, 1994

[54] WHEEL LOCK DETECTION ARRANGEMENT FOR MULTIPLE-AXLE RAILWAY VEHICLES

[75] Inventors: James A. Wood, Spartanburg, S.C.; John W. Drake, Cincinnati, Ohio; David J. Pesolar, Greer, S.C.

[73] Assignee: Westinghouse Air Brake Company, Wilmerding, Pa.

[21] Appl. No.: 17,168

[22] Filed: Feb. 12, 1993

Related U.S. Application Data

[63] Continuation of Ser. No. 715,075, Jun. 13, 1991, abandoned.

[51] Int. Cl.⁵ .................................................. B60T 8/88
[52] U.S. Cl. ......................................... 303/92; 303/7; 303/103; 364/426.05
[58] Field of Search ................. 303/7, 20, 92, 102, 303/103; 364/426.02, 426.03, 426.05; 180/197

[56] References Cited

U.S. PATENT DOCUMENTS

| | | | |
|---|---|---|---|
| 3,861,760 | 1/1975 | Hamelin | 303/92 |
| 4,031,509 | 6/1977 | Matulevich | 303/92 X |
| 4,161,717 | 7/1979 | Hoover et al. | 303/92 X |
| 4,164,872 | 8/1979 | Weigl | 303/96 X |
| 4,486,839 | 12/1984 | Mazur et al. | 303/95 X |
| 4,491,920 | 1/1985 | Wood et al. | 303/105 X |
| 4,972,145 | 11/1990 | Wood et al. | 303/92 X |
| 4,980,831 | 12/1990 | Katayama et al. | 303/98 X |
| 4,999,779 | 3/1991 | Wood et al. | 303/102 X |

FOREIGN PATENT DOCUMENTS

| | | | |
|---|---|---|---|
| 0328081 | 9/1989 | European Pat. Off. | 364/426.02 |
| 0128056 | 7/1985 | Japan | 303/92 |

Primary Examiner—Robert J. Oberleitner
Assistant Examiner—Josie A. Ballato
Attorney, Agent, or Firm—John B. Sotak

[57] ABSTRACT

An automatic and dynamic health monitoring system for detecting wheel lockup conditions caused by an unintentional unreleased handbrake or an unexpected traction motor seizure on multiple-axle railway vehicles by logically sensing and determining the status and operations of the input sensors and indicators to quickly and accurately diagnose the situation and to initiate an output fault code log signal.

17 Claims, 2 Drawing Sheets

WHEEL LOCK DETECTION ARRANGEMENT FOR MULTIPLE-AXLE RAILWAY VEHICLES

This is a continuation of application Ser. No. 07/715,075, filed Jun. 13, 1991, now abandoned.

FIELD OF THE INVENTION

This invention relates to a unique automatic and dynamic health monitoring system for railway vehicles and more particularly to a system for readily detecting an unintentional locked wheel condition which is inadvertently caused by an unreleased brake or is the result of the seizure of a drive or traction motor on a railway mass and/or rapid transit vehicle.

BACKGROUND OF THE INVENTION

In certain types of transportation systems, such as in the state of the art high speed railway and mass and/or rapid transit operations, there is a real need to automatically and dynamically sense and detect a wheel lockup condition in which the hand brake is unintentionally left on in its applied position or due to the seizing up of an electric drive motor. In the past, the maintenance personnel eventually discovered the locked wheel condition, but generally not until significant damage occurs to the affected wheels on the vehicle. For example, in addition to flat spots, the wheels can experience fissures and cracks due to the build-up of excessive heat, which can result in premature wheel failure. Further, the resultant damage caused by an unintentional handbrake left on in the applied position is often covered up by the operating personnel involved in the incident and the resulting impairment is usually blamed on other properly operating equipment or satisfactory functioning vehicle systems. Unfortunately, such situations tend to mask the dereliction and results in costly and unnecessary diagnosis and testing of the sound functioning apparatus.

OBJECTS AND SUMMARY OF THE INVENTION

Accordingly, it is an object of this invention to provide a system which can quickly and positively diagnose a locked wheel condition on multiple-axle railway vehicles.

Another object of this invention is to provide an automatic and dynamic health monitoring system for sensing and recognizing a wheel lockup state caused by an unintentional left-on handbrake or a drive motor seizure on a powered transit vehicle.

A further object of this invention is to provide a wheel lock detection arrangement which is capable of differentiating a failed speed sensor and/or an actual slip condition from a locked wheel condition.

Still another object of this invention is to provide a transit rail car wheel lock sensing and detecting process which is utilized to inform operating personnel of a potential equipment damaging situation which may be caused by an unintentional left-applied handbrake or a traction motor lockup.

Still a further object of this invention is to provide a system for sensing and detecting a wheel locked condition on a mass and/or rapid transit railway vehicle to minimize damage of flat spots and heat causing fissures and cracks.

Yet a further object of this invention is to provide a wheel lock detection arrangement for a multiple axle railway vehicle comprising, first means for determining that the speed of the vehicle is below a first given value, second means for sensing that the speed of the vehicle is higher than a second given value, third means for determining the operation of the brake cylinder pressure sensors on the vehicle, fourth means for determining the operation of the speed sensors on the vehicle, fifth means for indicating when the speed sensors are improperly gapped, sixth means for checking the integrity of the axle speed and rate signals, seventh means for sensing the operational integrity of each of the above six means, eighth means for comparing the highest axle speed with the speed of the axle being tested, ninth means for determining if a decelerating axle is about to go into a wheel slide condition, tenth means for determining if an accelerating axle is about to go into a wheel slide condition, eleventh means for detecting an inability to correct a wheel slide condition within a set time limit, twelfth means for indicating a wheel lockup has occurred in a brake operating mode, and thirteenth means for determining and logging the presence of a wheel lockup condition.

Yet another object of this invention is to provide an automatic and dynamic vehicle health monitoring system comprising, means for producing a first logical signal when the highest axle speed of the vehicle signifies a zero speed condition, means for producing a first logical signal when the highest axle speed of the vehicle signified is above a given value, means for producing a first logical signal when each of the wheel cylinder pressure sensors on the trucks of the vehicle is operating properly, means for producing a first logical signal when each of the station stop speed sensors on the vehicle is operating properly, means for producing a first logical signal when the gap of each of the speed sensors on the vehicle is proper, means for producing a first logical signal when each of the velocity circuits of the axles of the vehicle is operating properly, means for producing a first logical signal when each of the above-mentioned means produce the first logical signal, means for producing a first logical signal when the highest axle speed minus the axle speed of the vehicle is equivalent to the highest axle speed divided by 2, means for producing a first logical signal when the axle rate of the vehicle is less than a first rate and is greater than a second rate, means for producing a first logical signal when all of its inputs are a first logical signal, means for producing a first logical signal when an axle is undergoing a slide control and the axle rate is less than a given value for a given period of time, means for producing a first logical signal when all of its input are a first logical signal and a truck wheel feedback signal indicates a release condition for a given period of time and the wheel cylinder pressure on the respective truck of the vehicle is less than a given value, means for producing a wheel lock alert signal if within a given number of station stops a minimum of first logical signals are received.

DESCRIPTION OF THE DRAWINGS

The above objects and other attendant features will be more readily appreciated as the subject invention becomes better understood by reference to the following detailed description when considered in conjunction with the accompanying drawings, wherein:

FIG. 1a is disposed to the left while FIG. 1b is disposed to the right, or an automatic and dynamic vehicle health monitoring circuit arrangement for sensing and detecting a locked up wheel condition on a multiple-axle railway transit vehicle in accordance with the present invention.

DETAILED DESCRIPTION OF THE INVENTION

Figure 1A:
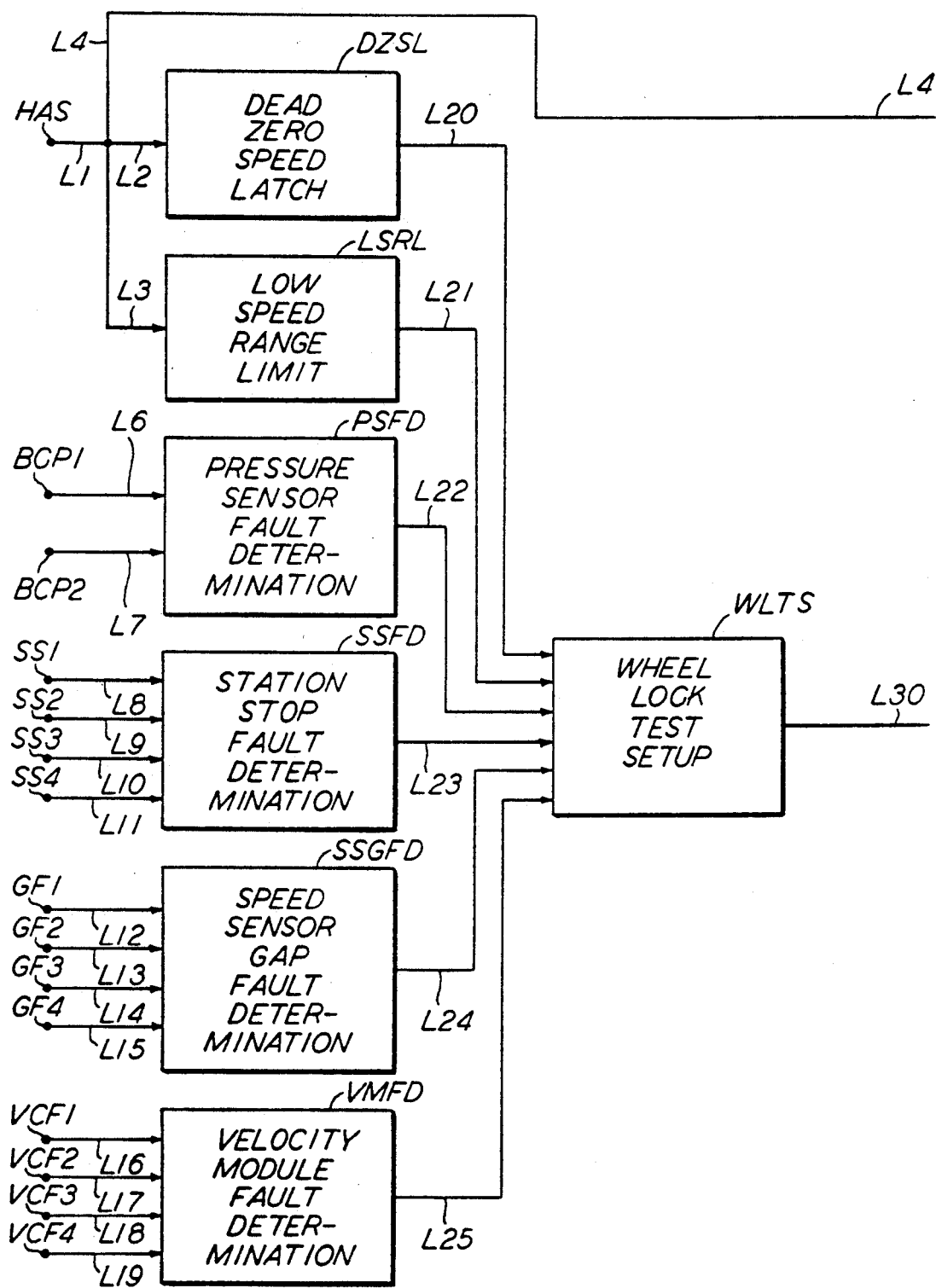
FIGS. 1a and 1b illustrate a schematic circuit block diagram which, when placed in side by side relationship, namely, when
Figure 1B:
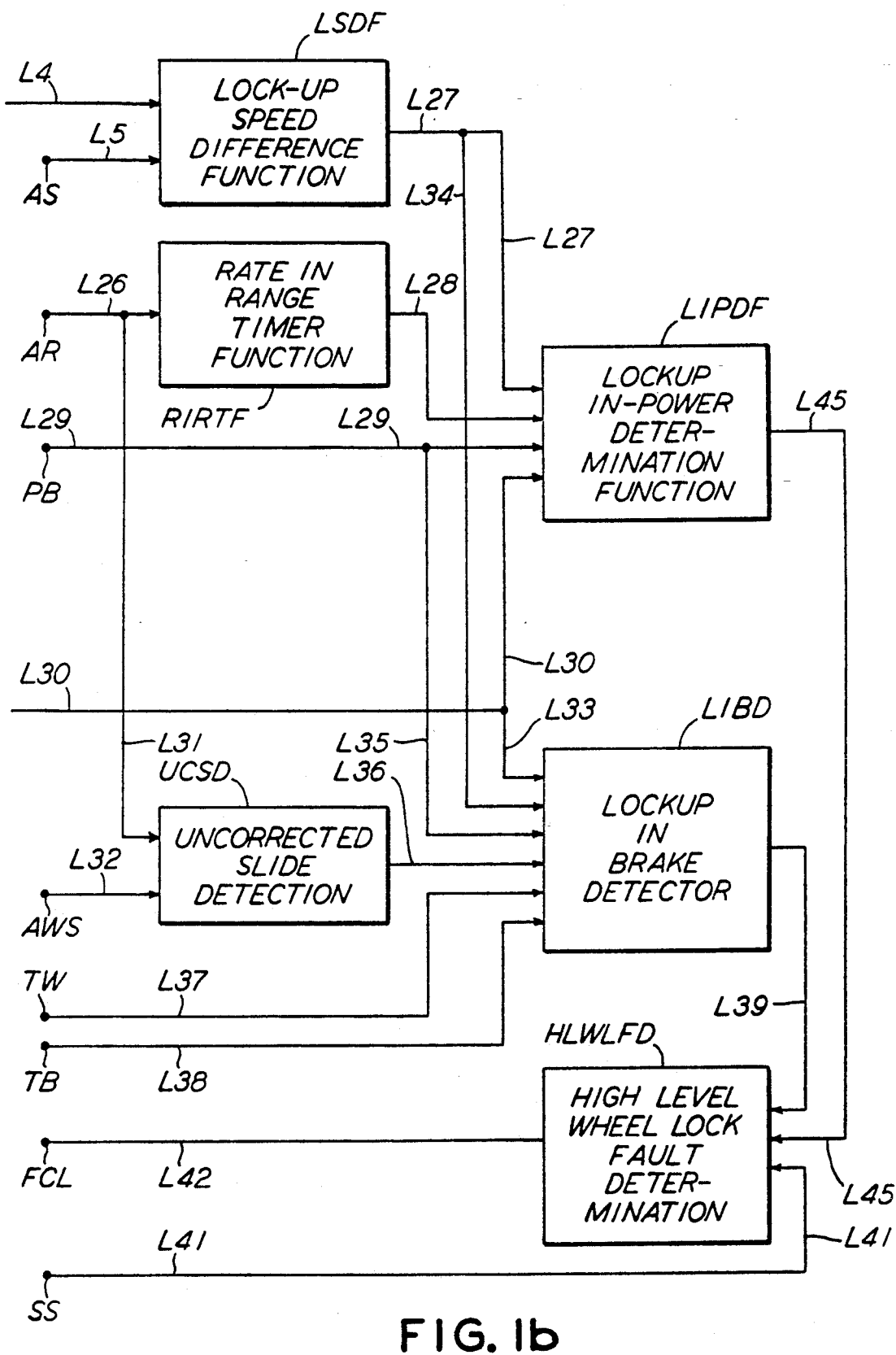

Referring now to the FIGS. 1a and 1b of the drawings, there is shown a schematic block diagram of a wheel lockup system for determining and recognizing when a drive motor is locked up or when a handbrake is inadvertently left on in its applied position on a railway mass and/or rapid transit vehicle. In operation, the health monitoring system is designed to accommodate a multiple axle or four axle self-powered or non-powered transit vehicle or car. The front truck of the railway vehicle includes a first pair of axles while the rear truck of the railway vehicles includes a second pair of axles. It will be appreciated that the air brake cylinder pressure on each of the front and rear trucks is measured by a suitable pressure sensor, such a variable capacitance diaphragm device or the like. As shown and described in U.S. Pat. No. 4,972,145, each axle of the railway vehicle is provided with a suitable electromagnetic speed sensor which includes a rotating tooth gear wheel. Thus, the rotational speed of each toothed gear wheel is sensed and monitored by a separately associated electromagnetic pickup device having a pole face which is normally preset at a selected distance from the tips of the teeth of the toothed gear wheel. Thus, when the toothed wheel is rotating, an alternating current voltage signal is produced in each of the pickup devices which is amplified, filtered, buffered, and pulse shaped. Thus, the pulse rate or frequency of each of the electrical signals is proportional to the velocity or speed of the wheels of the respective axles of the railway vehicle.

Referring again to the drawings, it will be seen an input terminal HAS is connected to the input of a dead zero speed latching circuit DZSL via leads L1 and L2 and is also connected to the input of a low speed range limiting circuit LSRL via leads L1 and L3 as well as being connected to a lockup speed difference function circuit LSDF via leads L1 and L4. The input signal on terminal HAS is determined by the highest prevailing speed registered by a given axle of the four axles of the railway vehicle. The function of the dead zero speed latching circuit DZSL is to determine if the vehicle has passed through a dead zero speed prior to performing a wheel lockup check. In certain transit equipment applications, and in this particular usage, there is a time period after the vehicle has reached a dead zero speed in which the automatic diagnostics are initiated and in which certain process variables are established. Thus, the dead zero speed latching circuit DZSL insures that these conditions have occurred prior to initiating any action. Now, if the highest axle speed signal which is performed on a per-car basis remains at a dead zero speed which is defined as less than one mile per hour (1 mph) for fifteen (15) seconds, the dead zero speed latching circuit DZSL outputs a logical "1". Now, if a transition occurs in which the highest axle speed signal goes from a value of greater than or equal to 1 mph to less than 1 mph, the dead zero speed latching circuit DZSL will reset and will output a logical "0".

As previously noted, the highest axle speed signal on input terminal HAS is conveyed to the input of the low speed range limiting circuit LSRL. The low-speed range limiting circuit LSRL functions to set a given low speed signal limit which is necessary since the operational process is not very reliable at low vehicle speeds. This function is also performed on a per-car basis. If the highest axle speed signal is greater than or equal to 9 mph, the low speed range limit circuit LSRL outputs a high or a logical "1", and, if not, the low speed range limit circuit LSRL outputs a low or a logical "0".

As noted above, the input terminal HAS is also connected to one input of the lockup speed difference function circuit LSDF via leads L1 and L4. Another speed signal is developed on an input terminal AS which is also connected to another input of the lockup speed difference function circuit LSDF via lead L5. The signal on terminal AS is representative of the speed of the axle which is under test. In operation, the lockup speed difference function circuit LSDF compares the highest axle speed signal with the speed signal of the axle which is presently being tested. It will be appreciated that an actual speed algorithm could be used in place of the highest axle speed signal. The comparison is employed to determine if the axle under test is locked up or is in eminent danger of becoming locked up. It will be understood that the comparing function is performed on a per-axle basis. Now, if the highest axle speed signal minus the axle speed signal under test is less than or equal to the highest axle speed signal divided by two (2), the lockup speed difference function circuit LSDF outputs a high or a logical "1" and, if not, it outputs a low or a logical "0".

As shown, a pressure sensor fault determination circuit PSFD has one of its two inputs connected to terminal BCP1 via lead L6 and has the other of its two inputs connected to terminal BCP2 via lead L7. The pressure sensor fault determination circuit PSFD determines or ascertains if the two brake cylinder pressure sensors on the respective trucks on the vehicle are operational. It will be appreciated that this portion of the logic process is dependent upon the proper operation of both of the truck brake cylinder pressure sensors. This function is performed on a per-car basis. If the brake cylinder pressure sensor on each truck does not indicate a fault, the pressure sensor fault determination circuit PSFD will output a high or a logical "1". If either or both of the brake cylinder pressure sensor fault log indicate a flaw, the pressure sensor fault determination circuit PSFD will output a low or a logical "0".

It will be seen that a station stop fault determination circuit SSFD receives a speed signal from each of the sensors of the four axles of the railway vehicle to determine if the respective speed sensor is operational. For example, the station stop fault determination circuit SSFD receives a first input signal on terminal SS1 from a first axle speed sensor while it receives a second input signal on terminal SS2 from a second axle speed sensor. Likewise, the station stop fault determination circuit SSFD receives a third input signal on terminal SS3 from a third axle speed sensor while it receives a fourth input signal on terminal SS4 from a fourth axle speed sensor. It will be noted that the first terminal SS1 is connected to a first input of the station stop fault determination circuit SSFD via lead L8 while the second terminal SS2 is connected to a second input of the station stop fault determination circuit SSFD via lead L9. Likewise, the third terminal SS3 is connected to a third input of the station stop fault determination circuit SSFD via lead L10 while the fourth terminal SS4 is connected to a fourth input of the station stop fault determination circuit SSFD via lead L11. The function of the station stop fault determination circuit SSFD is performed on a per-car basis. If all four axle speed sensors do not exhibit a fault, the station stop fault determination circuit SSFD will output a high or a logical "1". Conversely, if any one or more of the four axle speed sensors exhibit a fault, the station stop fault determination circuit SSFD will output a low or a logical "0".

As shown, a speed sensor gap fault determination circuit also receives a speed signal gap fault log signal for each of the four axles of the vehicle to determine if the air gap of each of the respective sensors is properly gapped. It will be seen that the speed sensor gap fault determination circuit SSGFD receives a first input signal on terminal GF1 from the first axle speed sensor while it receives a second input signal on terminal GF2 from the second axle speed sensor. Likewise, the speed sensor gap fault determination circuit SSGFD receives a third input signal on terminal GF3 from the third axle speed sensor while it receives a fourth input signal on terminal GF4 from the fourth axle speed sensor. It will be seen that the first terminal GF1 is connected to a first input of the speed sensor gap fault determination circuit SSGFD via lead L12 while the second terminal GF2 is connected to a second input of the speed sensor gap fault determination circuit SSGFD via lead L13. Similarly, the third input terminal GF3 is connected to a third input of the speed sensor gap fault determination circuit SSGFD via lead L14 while the fourth input terminal GFY is connected to a fourth input of the speed sensor gap fault determination circuit SSGFD via lead L15. It will be appreciated that, if any of the four axle speed sensors is improperly air gapped, there is a possibility that a confusing signal pattern will result in various problems. Accordingly, the function of the speed sensor gap fault determination circuit SSGFD is performed on a per-car basis to determine if there is a speed sensor gap problem. If none of the speed axle sensors indicate a low or erratic signal level, which is deduced from the truck records before the application of a fault tolerance, then the speed sensor gap fault determination circuit will output a high or a logical "1". Conversely, if any one of the four axle speed sensors indicates a low signal level, the speed sensor gap fault determination circuit SSGFD will produce a low or a logical "0".

It will be noted that a velocity module fault determination circuit VMFD checks the circuit integrity of the axle speed signals and the axle rate signals of each of the four axles of the transit vehicle. It will be understood that the velocity module fault determination circuit VMFD will restrict and preclude the operational processing if there is a fault in the circuit integrity. As shown, the velocity module fault determination circuit receives a first input signal on terminal VCF1 from the velocity circuit fault log and it also receives a second input signal on terminal VCF2 from the velocity circuit fault log. Likewise, the velocity module fault determination circuit VMFD receives a third input signal on terminal VCF3 from the velocity circuit fault log and also it receives a fourth input signal on terminal VCF4 from the velocity circuit fault log. It will be observed that the first terminal VCF1 is connected to the first input of the velocity module fault determination logic circuit VMFD via lead L16 while second terminal VCF2 is connected to a second input of the velocity module fault determination circuit VMFD via lead L17. Further, the third terminal VCF3 is connected to a third input of the velocity module fault determination circuit VMFD via lead L18 while the fourth terminal VCF4 is connected to a fourth input of the velocity module fault determination circuit VMFD via lead L19. The function of the velocity module fault determination circuit VMFD is performed on a per-car basis. If none of the four axles indicates a low level which is derived from the truck records before the application of a fault tolerance, then the velocity module fault determination circuit VMFD will generate a high or a logical "1". If one or more of the axles indicate a velocity circuit fault, then the velocity module fault determination circuit VMFD will output a low or a logical "0".

As shown, the output of the dead zero speed latch circuit is connected to a first input of a wheel lock test setup logic circuit WLTS via lead L20. The wheel lock test setup circuit is a six input AND logic gate circuit which combines all of the preliminary functional integrity checks of the six logic circuits DZSL, LSRL, PSFD, SSFD, SSGFD, and VMFD. Unless all of the six functional integrity checks are verified as properly operating, the further processing of the health monitoring operation will not continue until the fault is found and corrected. It will be seen that the output of the low speed range limit logic circuit LSRL is connected to a second input of the wheel lock test setup circuit WLTS via lead L21. Likewise, the output of the pressure sensor fault determination logic circuit is connected by lead L22 to the third input of the wheel lock test setup circuit WLTS while the output of the station stop fault determination logic circuit SSFD is connected by lead L23 to the fourth input of the wheel lock test setup circuit WLTS. Similarly, the output of the speed sensor gap fault determination logic circuit SSGFD is connected by lead L24 to the fifth input of the wheel lock test setup circuit WLTS while the output of the velocity module fault determination logic circuit VMFD is connected by lead L25 to the sixth input of the wheel lock setup circuit WLTS. This function of the wheel lock test setup circuit WLTS is performed on a per-car basis. If all of the six inputs to the wheel lock test setup circuit WLTS are a logical "1", the output of the wheel lock test setup circuit will be a logical "1". Conversely, if any of the inputs to the wheel lock test setup logic circuit WLTS is a logical "0", then this circuit will output a logical "0".

As shown, a rate in range timer function logic circuit RIRTF determines if an axle is in a deceleration rate band indicating that it is going into a wheel slide condition. The band is purposely selected to exclude certain signals that are associated with the loss of speed signals which is opposite the previously discussed speed sensor gap fault pattern detection. The rate in range timer function circuit RIRTF receives its sole input from axle rate terminal AR via lead L26. It will be appreciated that the function of the rate in range timer function circuit RIRTF is performed on a per-axle basis. If the axle rate is less than −5.0 MPHS and is greater than −25.6 MPHS at all times during a 1.5 second time period, the rate in range timer function circuit RIRTF will output a high or a logical "1", and if not, it will output a low or a logical "0".

It will be seen that a lockup in-power determination function logic circuit LIPDF determines if an axle has experienced or is about to undergo a wheel slide condition in a power mode of operation in which the brakes are normally in a released condition. In operation, the lockup in-power determination function circuit LIPDF recognizes that the transit vehicle is in a power operating mode so that the brakes should be released. Thus, the integrity of the equipment is accepted since no erroneous signal is evident and it will determine that an axle is about to or is already in a sliding condition. It will be noted that the lockup in-power determination function circuit LIPDF is in fact a four input AND logic gate. The first input of the lockup in-power determination function AND circuit LIPDF is connected to the output of the lockup speed difference function circuit LSDF via lead L27, and the second input of the lockup in-power determination function circuit LIPDF is connected to the output of the rate in range timer function circuit RIRTF via lead L28. The third input of the lockup in-power determination function circuit LIPDF is connected to the in-power/in-brake terminal PB via lead L29, and the fourth input of the lockup in-power determination function circuit LIPDF is connected to the output of the wheel lock test setup circuit WLTS via lead L30. It will be noted that the function of the lockup in-power determination function circuit LIPDF is performed on a per-axle basis. If all of the inputs to the lockup in-power determination function circuit LIPDF are a logical "1", it will output a high or a logical "1", and if not, it will output a low or logical "0".

It will be observed that a two-input uncorrected slide detection logic circuit UCSD has one input connected to the axle rate terminal AR via leads L26 and L31 and has another input connected to an axle wheel slide indication terminal AWS via lead L32. The function of the uncorrected slide detection circuit UCSD is to use the incoming information from the wheel slide control system to monitor the responses of the axles during slide control activity. The uncorrected slide detection circuits UCSD functions and detects any incidents of the inability to begin correction of a slide within a set time limit. The function of the uncorrected slide detection circuit UCSD is performed on a per-axle basis. If the axle wheel slide indication on terminal AWS reports that an axle is undergoing a slide control and the axle rate on terminal AR is less than 1 MPHPS for at least 2.5 seconds, then the uncorrected slide detection circuit will output a high or a logical "1". On the other hand, an axle rate greater than or equal to 1 MPHPS will cause the uncorrected slide detection circuit UCSD to reset so that it will output a low or logical "0".

As shown, a lock-up in-brake detector logic circuit LIBD includes a first input which is connected to the output of the wheel lock test setup circuit WLTS via leads L30 and L33. The second input to the lockup in-brake detector circuit LIBD is connected to the output of the lockup speed difference function circuit LSDF terminal PB via leads L27 and L34 while its third input is connected to the in-power in-brake terminal PB via lead L29 and L35. The fourth input of the lockup in-brake detector circuit LIBD is connected to the output of the uncorrected slide detection circuit UCSD via lead L36. The fifth input of the lockup in-brake detector circuit is connected to a truck wheel slide control valve feedback terminal TW via lead L37 and its sixth input is connected to a truck brake cylinder pressure sensor terminal TB via lead L38. If each of the inputs from the wheel lock test setup logic circuit WLTS, the lockup speed difference function logic circuit LSDF and the uncorrected slide detection logic circuit UCSD is a logical "1" and the signal on terminal PB signifies that the vehicle is in a braking mode, the respective truck wheel slide feedback indicates a release state or a release pulse for at least the previous 1.0 second and the respective truck brake cylinder pressure is less than 3 psig, will result in the lockup in-brake detector logic circuit LIBD to produce a logical "1". If any one of these inputs is not present, the lockup in-brake detector circuit LIBD will generate a logical "0".

As shown, a high level wheel lock fault determination or counter logic circuit HLWLFD includes a first input which is connected to the output of the lockup in-brake detector circuit LIBD via lead L39. The high level wheel lock fault determination circuit HLWLFD also has a second input connected to the output of the lockup in-power determination function circuit LIPDF via lead L45. A third input is supplied to the high level wheel lock fault determination circuit HLWLFD from a station stop test routine indication terminal SS via lead L41. The function of the high level wheel lock fault determination circuit HLWLFD is performed on a per-axle basis. The station stop test routine indication circuit monitors the number of station stops, and if within five (5) station stops the high level wheel lock fault determination circuit HLWLFD receives three (3) logical "1" signals from either or both of the lockup in-brake detector circuit LIBD or the lockup in-power determination function circuit LIPDF, a high level wheel alert signal will be produced for the respective axle. The output is conveyed to the RAM fault code log terminal FCL via lead L42. It will be appreciated a high or a logical "1" signal on terminal FCL is logged and registered in a battery-backed RAM so that appropriate action will ensue to perform preventative measures on the transit vehicle.

It will be appreciated that the present invention monitors the integrity of the system interfaces of the railway vehicle and suppresses the fault detection activity when the system interfaces are not functioning properly. The present system employs a pattern recognition technique of the dynamic signals to determine if a wheel lockup condition exists. In practice, the processing system utilizes the pattern recognition method for screening out certain events which can erroneously simulate a wheel lockup condition that a handbrake is left on or a drive motor seizure has taken place. In operation, the process detects and monitors the dynamic slip correction responses to determine if a wheel lockup pattern exists. In addition, the processing arrangement monitors both the input and output states of the wheel slip control valves to dynamically ascertain that they have performed properly. Further, the system provides a parallel wheel lockup check in both the power and brake modes of operation to enhance the reliability of detection of a wheel lockup condition which is caused by an unintentional left-on handbrake or a seizure of the drive motor. Additionally, the process utilizes a distinctive fault tolerance technique to establish separate isolated incidents from consistent faulty pattern behaviors.

It will be understood that various alterations and changes may be made by those skilled in the art without departing from the spirit and scope of the subject invention. Further, with the advent of microprocessors and minicomputers, it is evident that the various functions and operations may be carried out and processed by a suitably programmed computer which receives the different inputs and produces the appropriate output. Therefore, it will be appreciated that certain modifications, ramifications, and equivalents will be readily apparent to persons skilled in the art, and accordingly, it is understood that the present invention should not be limited to the exact embodiment shown and described, but should be accorded the full scope and protection of the appended claims.

What we claim is:

1. A wheel lock detection arrangement for a multiple-axle railway vehicle comprising, first means connected to a highest speed terminal for determining that the speed of the vehicle is below a first given value, second means connected to the highest speed terminal for sensing that the speed of the vehicle is higher than a second given value, third means connected to a pair of speed sensor terminals for determining the operation of brake cylinder pressure sensors on the vehicle, fourth means connected to a plurality of speed sensor terminals for determining the operation of the speed sensors on the vehicle, fifth means connected to the plurality of speed sensor terminals for indicating when the speed sensors are improperly gapped, sixth means connected to a plurality of velocity fault log terminals for checking the integrity of axle speed and rate signals, seventh means connected to each of the above six means for sensing the operational integrity of each of the above six means, eighth means connected to the highest speed terminal and another speed terminal for comparing the highest axle speed with the speed of an axle being tested, ninth means connected to an axle rate terminal for determining if a decelerating axle is about to go into a wheel slide condition, tenth means connected to the eighth means, the ninth means, as in power/in brake terminal and the seventh means for determining if an accelerating axle is about to go into a wheel slide condition, eleventh means connected to the axle rate terminal and an axle wheel slide indication terminal for detecting an inability to correct a wheel slide condition within a set time limit, twelfth means connected to the seventh means, the eighth means, the in power/in brake terminal, the eleventh means, a truck wheel slide valve feedback terminal, and a truck brake cylinder pressure sensor terminal for indicating a wheel lockup has occurred in a brake operating mode, and thirteenth means connected to the tenth means, the twelfth means and a station stop test routine indication terminal for determining and logging the presence of a wheel lockup condition when a hand brake is left on or when a drive motor is seized by producing a wheel lock alert signal to inform operating personnel of a potential equipment damaging situation.

2. The wheel lock detection arrangement for a multiple-axle railway vehicle as defined in claim 1, wherein a determination function of said first means is performed on a per-car basis.

3. The wheel lock detection arrangement for a multiple-axle railway vehicle as defined in claim 1, wherein a sensing function of said second means is performed on a per-car basis.

4. The wheel lock detection arrangement for a multiple-axle railway vehicle as defined in claim 1, wherein a determination function of said third means is performed on a per-car basis.

5. The wheel lock detection arrangement for a multiple-axle railway vehicle as defined in claim 1, wherein a determination function of said fourth means is performed on a per-car basis.

6. The wheel lock detection arrangement for a multiple-axle railway vehicle as defined in claim 1, wherein a indicating function of said fifth means is performed on a per-car basis.

7. The wheel lock detection arrangement for a multiple-axle railway vehicle as defined in claim 1, wherein a checking function of said sixth means is performed on a per-car basis.

8. The wheel lock detection arrangement for a multiple-axle railway vehicle as defined in claim 1, wherein a sensing function of said seventh means is performed on a per-car basis.

9. The wheel lock detection arrangement for a multiple-axle railway vehicle as defined in claim 1, wherein a comparing function of said eighth means is performed on a per-axle basis.

10. The wheel lock detection arrangement for a multiple-axle railway vehicle as defined in claim 1, wherein a determination function of said ninth means is performed on a per-axle basis.

11. The wheel lock detection arrangement for a multiple-axle railway vehicle as defined in claim 1, wherein a determination function of said tenth means is performed on a per-axle basis.

12. The wheel lock detection arrangement for a multiple-axle railway vehicle as defined in claim 1, wherein a detecting function of said eleventh means is performed on a per-axle basis.

13. The wheel lock detection arrangement for a multiple-axle railway vehicle as defined in claim 1, wherein a indicating function of said twelfth means is performed on a per-axle basis.

14. The wheel lock detection arrangement for a multiple-axle railway vehicle as defined in claim 1, wherein a determination and logging function of said thirteenth means is performed on a per-axle basis.

15. The wheel lock detection arrangement for a multiple-axle railway vehicle as defined in claim 1, wherein said seventh means is a six-input AND gate.

16. A wheel lock detection arrangement for a multiple-axle railway vehicle comprising, a dead zero speed latching means for determining that the speed of the vehicle is below a first given value, a low speed range limiting means for sensing that the speed of the vehicle is higher than a second given value, a pressure sensor fault determination means for determining the operation of brake cylinder pressure sensors on the vehicle, a station stop fault determination means for determining the operation of speed sensors on the vehicle, a speed sensor gap fault determination means for indicating when the speed sensors are improperly gapped, a velocity module fault determination means for checking the integrity of axle speed and rate signals, a wheel lock test setup means for sensing the operational integrity of each of the previous means, a lockup speed difference means for comparing a highest axle speed with the speed of an axle being tested, a rate in range timer function means for determining if a decelerating axle is about to go into a wheel slide condition, a lockup in-power determination function means for determining if an accelerating axle is about to go into a wheel slide condition, an uncorrected slide detection means for detecting an inability to correct a wheel slide condition within a set time limit, a lockup in-brake detector means for indicating a wheel lockup has occurred in a brake operating mode, and a high level wheel lock fault determination counter means for determining and logging the presence of a wheel lockup condition.

17. An automatic and dynamic vehicle health monitoring system comprising, means connected for producing a first logical signal when a highest axle speed of a vehicle signifies a zero speed condition, means connected for producing a first logical signal when the highest axle speed of the vehicle signified is above a given value, means connected for producing a first logical signal when each of a plurality of wheel cylinder pressure sensors on the vehicle is operating properly, means connected for producing a first logical signal when each of a plurality of station stop speed sensors on the vehicle is operating properly, means connected for producing a first logical signal when a gap of each of the speed sensors on the vehicle is proper, means connected for producing a first logical signal when each of a plurality of velocity circuits of the axles of the vehicle is operating properly, means connected for producing a first logical signal when all of the above-mentioned means produce a first logical signal, means connected for producing a first logical signal when the highest axle speed minus the axle speed of the vehicle is equivalent to the highest axle speed divided by 2, means connected for producing a first logical signal when an axle rate of the vehicle is less than a first rate and is greater than a second rate, means connected for producing a first logical signal when all inputs are a first logical signal, means connected for producing a first logical signal when one of the axles is undergoing a slide control and the axle rate is less than a given value for a given period of time, means connected for producing a first logical signal when all inputs are a first logical signal and a wheel feedback signal indicates a release condition for a given period of time and wheel cylinder pressure on the vehicle is less than a given value, and means connected for producing a wheel lock alert signal if within a given number of station stops a minimum of first logical signals are received so as to inform operating personnel of a potential equipment damaging situation which may be caused by an unintentional left-applied hand brake or a traction motor lockup.

* * * * *